United States Patent
Hur et al.

(10) Patent No.: US 10,414,860 B2
(45) Date of Patent: Sep. 17, 2019

(54) POLYCARBONATE RESIN AND PREPARATION METHOD THEREFOR

(71) Applicant: LOTTE ADVANCED MATERIALS CO., LTD., Yeosu-si (KR)

(72) Inventors: Jong Chan Hur, Uiwang-si (KR); Jun Ho Chi, Uiwang-si (KR); Woo Suk Chei, Uiwang-si (KR); O Sung Kwon, Uiwang-si (KR); Jung Jae Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 72 days.

(21) Appl. No.: 15/575,547

(22) PCT Filed: May 25, 2016

(86) PCT No.: PCT/KR2016/005526
§ 371 (c)(1),
(2) Date: Nov. 20, 2017

(87) PCT Pub. No.: WO2016/195312
PCT Pub. Date: Dec. 8, 2016

(65) Prior Publication Data
US 2018/0127541 A1 May 10, 2018

(30) Foreign Application Priority Data

May 29, 2015 (KR) .................. 10-2015-0076164

(51) Int. Cl.
*C08G 64/08* (2006.01)
*C08L 69/00* (2006.01)
*C08G 64/30* (2006.01)
*C08K 5/524* (2006.01)

(52) U.S. Cl.
CPC ......... *C08G 64/083* (2013.01); *C08G 64/305* (2013.01); *C08G 64/307* (2013.01); *C08K 5/524* (2013.01); *C08L 69/00* (2013.01); *C08L 2201/02* (2013.01); *C08L 2201/08* (2013.01); *C08L 2201/10* (2013.01)

(58) Field of Classification Search
CPC .. C08G 64/083; C08G 64/305; C08G 64/307; C08L 69/00
See application file for complete search history.

(56) References Cited

U.S. PATENT DOCUMENTS

| 4,481,350 A | 11/1984 | Schmidt et al. |
| 5,576,413 A | 11/1996 | Bussink et al. |
| 9,664,818 B2 | 5/2017 | Kawai |
| 10,059,840 B2 | 8/2018 | Kawai |
| 2011/0237695 A1 | 9/2011 | Hoerold et al. |
| 2015/0038615 A1 | 2/2015 | Chi et al. |

FOREIGN PATENT DOCUMENTS

| CN | 102906195 A | 1/2013 |
| CN | 103827169 A | 5/2014 |
| JP | 2007-254644 | * 10/2007 |
| JP | 2007-254644 A | 10/2007 |
| KR | 10-2013-0031702 A | 3/2013 |
| KR | 10-2013-0062914 A | 6/2013 |
| KR | 10-2014-0075516 A | 6/2014 |
| WO | 2016/195312 A1 | 12/2016 |

OTHER PUBLICATIONS

Machine translation of JP 2007-254644 (Year: 2007).*
International Search Report in counterpart International Application No. PCT/KR2016/005526 dated Aug. 25, 2016, pp. 1-4.
Office Action in counterpart Chinese Application No. 201680031123.9 dated Apr. 30, 2019, pp. 1-5.

* cited by examiner

*Primary Examiner* — Edward J Cain
(74) *Attorney, Agent, or Firm* — Additon, Higgins & Pendleton, P.A.

(57) ABSTRACT

A polycarbonate resin of the present invention comprises: a repeat unit represented by chemical formula 1 in the specification; a repeat unit represented by chemical formula 2; and a repeat unit represented by chemical formula 3. The polycarbonate resin has excellent flame retardancy, thermal resistance, transparency, impact resistance, etc.

12 Claims, No Drawings

POLYCARBONATE RESIN AND PREPARATION METHOD THEREFOR

CROSS-REFERENCE TO RELATED APPLICATIONS

This application claims priority to and the benefit of International Application No. PCT/KR2016/005526, filed May 25, 2016, which published as WO 2016/195312 on Dec. 8, 2016; and Korean Patent Application No. 10-2015-0076164, filed in the Korean Intellectual Property Office on May 29, 2015, the entire disclosure of each of which is incorporated herein by reference.

TECHNICAL FIELD

The present invention relates to a polycarbonate resin and a method of preparing the same. More particularly, the present invention relates to a branched polycarbonate resin which has good properties in terms of flame retardancy, heat resistance, transparency, and impact resistance, a method of preparing the same, and a molded article formed of the same.

BACKGROUND ART

A polycarbonate resin is a typical thermoplastic material that has good properties in terms of impact resistance, self-extinguishability, dimensional stability, heat resistance and transparency and is widely used in electric/electronic products, automobile parts, office equipment, optical films, and the like. Particularly, a polycarbonate resin is widely used as an exterior material for electric/electronic products and an interior/exterior material for automobile parts. Such an exterior material for electric/electronic products requires better flame retardancy. For this purpose, techniques for improving flame retardancy by adding a flame retardant to a polycarbonate resin have been continuously developed.

However, when an excess of low-molecular-weight flame retardant is used in a polycarbonate resin, the polycarbonate resin can suffer from deterioration in impact resistance and appearance despite having improved flame retardancy. In order to improve the reduced impact resistance, an impact modifier and the like may be used. However, use of the impact modifier can cause reduction in transparency of the polycarbonate resin. In addition, when an anti-dripping agent is added to provide flame retardancy to a thin polycarbonate resin, the polycarbonate resin can suffer from reduction in transparency of the polycarbonate resin.

Therefore, there is a need for a polycarbonate resin which can have good properties in terms of flame retardancy and heat resistance without deterioration in impact resistance and transparency.

One example of the related art is disclosed in U.S. Pat. No. 5,576,413.

DISCLOSURE

Technical Problem

It is one object of the present invention to provide a polycarbonate resin, which has good properties in terms of flame retardancy, heat resistance, transparency and impact resistance, a method of preparing the same, and a molded article including the same.

It is another object of the present invention to provide a molded article formed of the polycarbonate resin as set forth above.

The above and other objects of the present invention can be achieved by the present invention described below.

Technical Solution

One aspect of the present invention relates to a polycarbonate resin. The polycarbonate resin includes: a repeat unit represented by Formula 1; a repeat unit represented by Formula 2; and a unit represented by Formula 3:

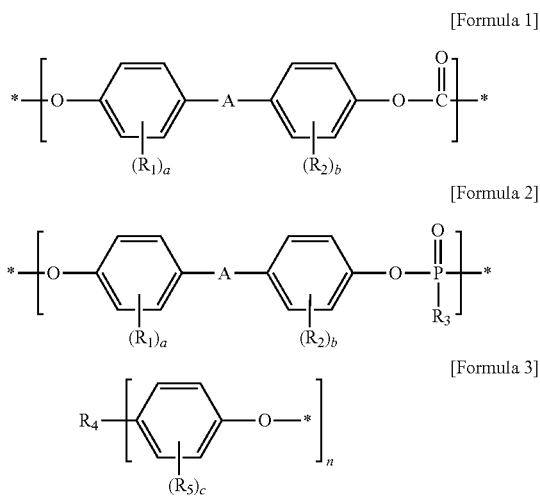

wherein A is a single bond, a $C_1$ to $C_{20}$ hydrocarbon group, —CO—, —O—, —S—, or —$SO_2$—; $R_1$, $R_2$, and $R_5$ are each independently a halogen atom or a $C_1$ to $C_{10}$ hydrocarbon group; $R_3$ is a $C_1$ to $C_{20}$ alkyl group, a $C_6$ to $C_{20}$ aryl group, a $C_1$ to $C_{20}$ alkoxy group, or a $C_6$ to $C_{20}$ aryloxy group; $R_4$ is a $C_1$ to $C_{20}$ hydrocarbon group; a, b, and c are each independently an integer of 0 to 4; n is an integer of 3 to 6; and * is a binding site.

A molar ratio of the repeat unit represented by Formula 1 to the repeat unit represented by Formula 2 may range from about 5:1 to about 100:1, and the unit represented by Formula 3 may be present in an amount of about 0.01 parts by mole to about 10 parts by mole relative to 100 parts by mole of the repeat unit represented by Formula 1 and the repeat unit represented by Formula 2.

The polycarbonate resin may have a weight average molecular weight of about 10,000 g/mol to about 200,000 g/mol.

The polycarbonate resin may have an intrinsic viscosity of about 0.1 dl/g to about 3.0 dl/g.

The polycarbonate resin may have a Mark-Houwink constant of about 0.50 to about 0.65.

The polycarbonate resin may have a flame retardancy of V-1 or more, as measured on an about 2.0 mm thick specimen by the UL-94 vertical test method.

The polycarbonate resin may have a notched Izod impact strength of about 6 kgf·cm/cm to about 20 kgf·cm/cm, as measured on an about ⅛" thick specimen in accordance with ASTM D256.

The polycarbonate resin may have a transmittance of about 85% or more, as measured on an about 3.2 mm thick specimen in accordance with ASTM D1003.

The polycarbonate resin may have a Vicat softening temperature of about 130° C. or more, as measured under a load of about 5 kg in accordance with ASTM D1525.

Another aspect of the present invention relates to a method of preparing a polycarbonate resin including: reacting a diol compound represented by Formula 4 with a carbonate ester compound represented by Formula 5, a phosphoric acid ester compound represented by Formula 6, and a compound represented by Formula 7:

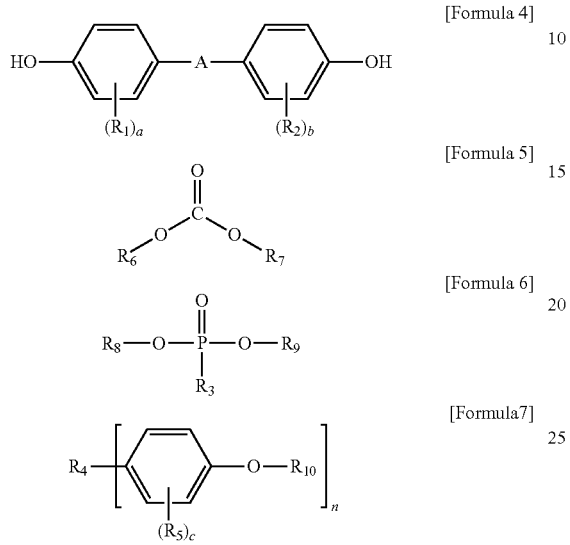

wherein A is a single bond, a $C_1$ to $C_{20}$ hydrocarbon group, —CO—, —O—, —S—, or —$SO_2$—; $R_1$, $R_2$, and $R_5$ are each independently a halogen atom or a $C_1$ to $C_{10}$ hydrocarbon group; $R_3$ is a $C_1$ to $C_{20}$ alkyl group, a $C_6$ to $C_{20}$ aryl group, a $C_1$ to $C_{20}$ alkoxy group, or a $C_6$ to $C_{20}$ aryloxy group; $R_4$ is a $C_1$ to $C_{20}$ hydrocarbon group; $R_6$, $R_7$, $R_8$ and $R_9$ are each independently a $C_1$ to $C_{10}$ hydrocarbon group; $R_{10}$ is a hydrogen atom, a $C_1$ to $C_{10}$ alkyl group, or a $C_6$ to $C_{10}$ aryl group; a, b, and c are each independently an integer of 0 to 4; and n is an integer of 3 to 6.

A molar ratio of the carbonate ester compound represented by Formula 5 to the phosphoric acid ester compound represented by Formula 6 may range from about 5:1 to about 100:1; a total amount of the carbonate ester compound represented by Formula 5 and the phosphoric acid ester compound represented by Formula 6 may range from about 100 parts by mole to about 110 parts by mole relative to about 100 parts by mole of the diol compound represented by Formula 4; and an amount of the compound represented by Formula 7 may range from about 0.01 parts by mole to about 10 parts by mole.

A further aspect of the present invention relates to a molded article formed of the polycarbonate resin as set forth above.

Advantageous Effects

The present invention provides a polycarbonate resin which has good properties in terms of flame retardancy, heat resistance, transparency, and impact resistance and a method of preparing the same, and a molded article formed of the same. The polycarbonate resin can have good properties in terms of flame retardancy and heat resistance without addition of additives such as a flame retardant and an anti-dropping agent, thereby preventing reduction in transparency due to addition of the additives and thus can be useful as an exterior material for electric/electronic products.

BEST MODE

Hereinafter, embodiments of the present invention will be described in detail.

A polycarbonate resin according to the present invention is a branched copolymer including: a repeat unit represented by Formula 1; a repeat unit represented by Formula 2; and a unit represented by Formula 3.

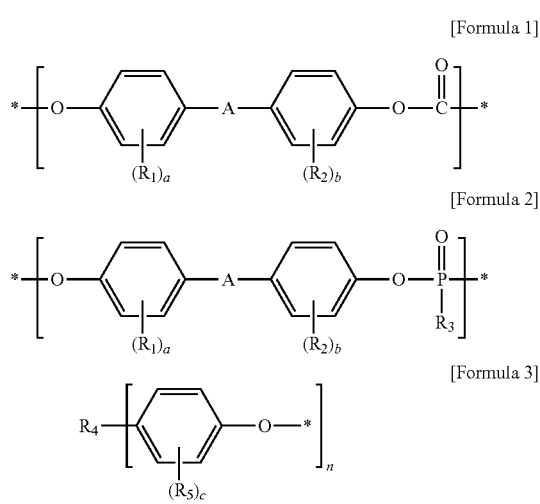

wherein A is a single bond, a $C_1$ to $C_{20}$ hydrocarbon group, for example, a $C_1$ to $C_{20}$ alkylene group, a $C_2$ to $C_5$ alkylidene group, a $C_5$ to $C_6$ cycloalkylene group, or a $C_5$ to $C_6$ cycloalkylidene group, —CO—, —O—, —S—, or —$SO_2$—; $R_1$, $R_2$, and $R_5$ are each independently a halogen atom such as a chlorine atom (Cl), a fluorine atom (F), and a bromine atom (Br) or a $C_1$ to $C_{10}$ hydrocarbon group, for example, a methyl group, an ethyl group, a propyl group, or a butyl group; $R_3$ is a $C_1$ to $C_{20}$ alkyl group, a $C_6$ to $C_{20}$ aryl group, a $C_1$ to $C_{20}$ alkoxy group, or a $C_6$ to $C_{20}$ aryloxy group, for example, a methyl group, an ethyl group, a propyl group, a butyl group, a phenyl group, a benzyl group, a naphthyl group, a methoxy group, an ethoxy group, a propoxy group, a butoxy group, a phenoxy group, a benzyloxy group, or a naphthyloxy group; $R_4$ is a $C_1$ to $C_{20}$ hydrocarbon group; a, b, and c are each independently an integer of 0 to 4; n is an integer of 3 to 6; and * is a binding site.

In one embodiment, the repeat unit represented by Formula 1 may be formed by transesterification of an (aromatic) diol compound with a carbonate ester compound (carbonate precursor) such as a diaryl carbonate and may be, for example, a repeat unit represented by Formula 1a, a repeat unit represented by Formula 1b, a repeat unit represented by Formula 1c, or a combination thereof, without being limited thereto.

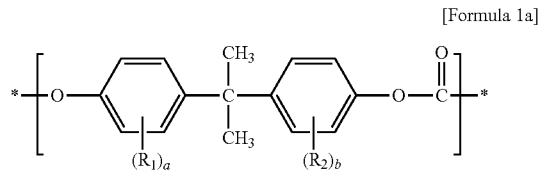

[Formula 1b]

[Formula 1c]

wherein $R_1$, $R_2$, a, b and * are the same as defined in Formula 1.

In one embodiment, the repeat unit represented by Formula 2 may be formed by transesterification of an (aromatic) diol compound with a phosphoric acid ester compound such as an aliphatic or aromatic phosphate and an aliphatic or aromatic phosphonate and may be, for example, a repeat unit represented by Formula 2a, a repeat unit represented by Formula 2b, a repeat unit represented by Formula 2c, or a combination thereof, without being limited thereto.

[Formula 2a]

[Formula 2b]

[Formula 2c]

wherein $R_1$, $R_2$, $R_3$, a, b and * are the same as defined in Formula 2.

In one embodiment, the repeat unit represented by Formula 3 may be a residue obtained by transesterification of a trihydric or more alcohol compound with a carbonate ester compound or a phosphoric acid ester compound to remove a hydrogen atom, an alkyl group, or an aryl group from a terminal hydroxyl group, alkoxy group or aryloxy group of the trihydric or more alcohol compound, and may be, for example, a unit represented by Formula 3a, a unit represented by Formula 3b, a unit represented by Formula 3c, or a combination thereof, without being limited thereto.

[Formula 3a]

[Formula 3b]

[Formula 3c]

[Formula 3d]

wherein * is a binding site.

In one embodiment, a molar ratio of the repeat unit represented by Formula 1 to the repeat unit represented by Formula 2 may range from about 5:1 to about 100:1, for example, about 10:1 to about 50:1, and the unit represented by Formula 3 may be present in an amount of about 0.01 parts by mole to about 10 parts by mole, for example, about 0.05 parts by mole to about 5 parts by mole, relative to 100 parts by mole of the repeat unit represented by Formula 1 and the repeat unit represented by Formula 2. Within this range, the polycarbonate resin may have good properties in terms of flame retardancy, heat resistance, transparency, impact resistance, and balance therebetween.

In one embodiment, the polycarbonate resin according to the present invention may be prepared using an (aromatic) diol compound, a trihydric or more alcohol compound, a carbonate precursor such as a carbonate ester compound, and a phosphoric acid ester compound by a typical polycarbonate resin preparation method known in the art. For example, the polycarbonate resin may be prepared by a polycarbonate preparation method which includes reacting a diol compound represented by Formula 4 with a carbonate ester compound represented by Formula 5, a phosphoric acid ester compound represented by Formula 6, and a compound represented by Formula 7:

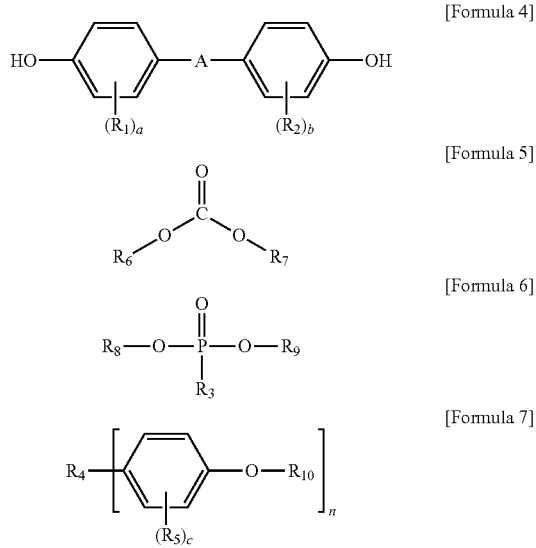

[Formula 4]

[Formula 5]

[Formula 6]

[Formula 7]

wherein A, $R_1$, $R_2$, $R_3$, $R_4$, $R_5$, $R_6$, $R_7$, $R_8$, $R_9$, a, b, c and n are the same as defined in Formulae 1, 2, and 3 and $R_{10}$ is a hydrogen atom, a $C_1$ to $C_{10}$ alkyl group, or a $C_6$ to $C_{10}$ aryl group.

In one embodiment, the diol compound represented by Formula 4 may be any typical diol compound used in preparation of a polycarbonate resin, for example, 2,2-bis(4-hydroxyphenyl) propane ("bisphenol A"), 4,4'-biphenol, bis(4-hydroxyphenyl) methane, 1,1-bis(4-hydroxyphenyl) cyclohexane, 2,2-bis(3-methyl-4-hydroxyphenyl) propane, 2,2-bis(3,5-dimethyl-4-hydroxyphenyl) propane, bis(4-hydroxyphenyl) sulfide, bis(4-hydroxyphenyl) sulfone, bis(4-hydroxyphenyl) sulfoxide, bis(4-hydroxyphenyl) ketone, or bis(4-hydroxyphenyl) ether, without being limited thereto. These compounds may be used alone or as a mixture thereof.

In one embodiment, in addition to the diol compound represented by Formula 4, the diol compound according to the present invention may further include an aliphatic diol compound and an aromatic diol compound other than the diol compound represented by Formula 4, without altering the effects of the present invention. Examples of the aliphatic diol compound may include 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cycloheptanediol, 1,3-cycloheptanediol, 1,4-cyclohexanedimethanol, 1,2-cyclooctanediol, 1,3-cyclooctanediol, 1,4-cyclooctanediol, and combinations thereof, and examples of the aromatic diol compound other than the diol compound represented by Formula 4 may include hydroquinone and resorcinol, without being limited thereto.

In one embodiment, the carbonate ester compound represented by Formula 5 may include any typical dialkyl carbonates, alkylaryl carbonates, or diaryl carbonates used in preparation of a polycarbonate resin, for example, diaryl carbonates such as diphenyl carbonate, without being limited thereto. These compounds may be used alone or as a mixture thereof.

In one embodiment, the phosphoric acid ester compound represented by Formula 6 may include typical aliphatic or aromatic phosphates or aliphatic or aromatic phosphonates, for example, diphenyl phenylphosphonate (PDPP), diphenyl benzylphosphonate (BDPP), diphenyl methylphosphonate (DPP), diphenyl methylphenylphosphonate, diphenyl ethylphosphonate, diphenyl propylphosphonate, diphenyl butylphosphonate, triphenyl phosphate, and diphenyl methylphosphate, without being limited thereto. These compounds may be used alone or as a mixture thereof.

In one embodiment, a molar ratio of the carbonate ester compound represented by Formula 5 to the phosphoric acid ester compound represented by Formula 6 (Formula 5:Formula 6) may range from about 5:1 to about 100:1, for example, about 5:1 to about 50:1. Within this range, the polycarbonate resin can have good properties in terms of flame retardancy, heat resistance, impact resistance, and the like.

In addition, the total amount of the carbonate ester compound represented by Formula 5 to the phosphoric acid ester compound represented by Formula 6 may range from about 100 parts by mole to about 110 parts by mole, for example, about 100 parts by mole to about 106 parts by mole, relative to about 100 parts by mole of the diol compound represent by Formula 4. Within this range, the yield of the reaction can be high in preparation of the polycarbonate resin.

In one embodiment, the compound represented by Formula 7 may be a trihydric or more alcohol or an ester thereof, which can form a branched structure, for example, a compound represented by Formula 7a (1,1,1-tris(4-hydroxyphenyl)ethane (THPE) and the like), a compound represented by Formula 7b, a compound represented by Formula 7c, a compound represented by Formula 7d, or a combination thereof

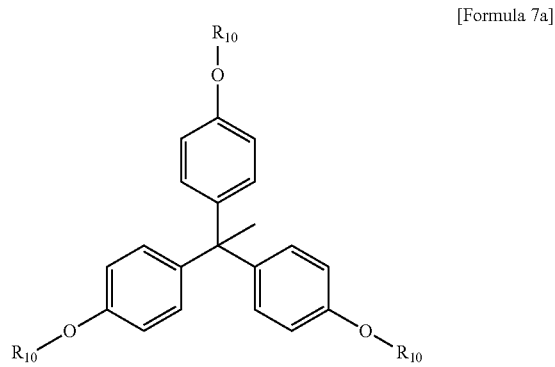

[Formula 7a]

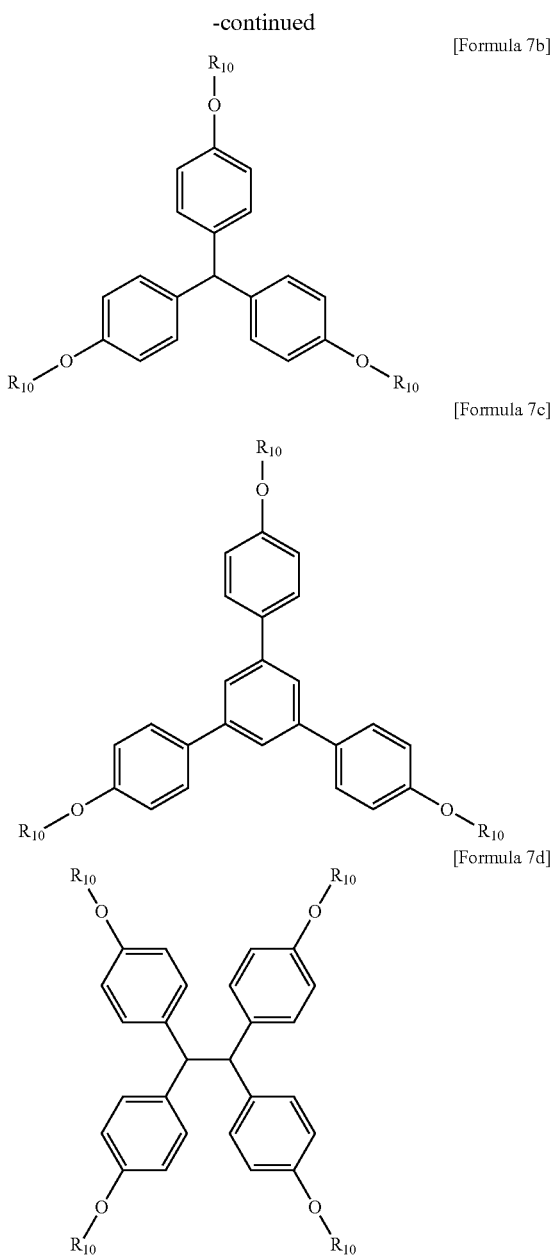

wherein $R_{10}$ is the same as defined in Formula 7.

In one embodiment, the compound represented by Formula 7 may be present in an amount of about 0.01 parts by mole to about 10 parts by mole, for example, about 0.05 parts by mole to about 5 parts by mole, relative to about 100 parts by mole of the diol compound represented by Formula 4. Within this range, the polycarbonate resin can have good properties in terms of flame retardancy, heat resistance, transparency, impact resistance, and balance therebetween.

In one embodiment, the reaction (transesterification) may be carried out at a temperature of about 150° C. to about 330° C., for example, about 160° C. to about 280° C., at atmospheric pressure or at reduced pressure, for example, at about 100 torr or less, specifically about 30 torr or less, more specifically about 1 torr or less, for about 10 minutes to about 24 hours, for example, about 30 minutes to about 12 hours. When the reaction is performed under these conditions, advantageous effects can be obtained in terms of reduction in side reaction and reaction rate.

In one embodiment, the reaction may be carried out in the presence of a catalyst. The catalyst may be any typical catalyst used in transesterification, for example, an alkali metal catalyst or an alkaline earth metal catalyst. Examples of the alkali metal catalyst may include LiOH, NaOH, and KOH, without being limited thereto. These may be used alone or as a mixture thereof. The catalyst may be used in an amount of about 40 ppb (by weight) to about 600 ppb (by weight), for example, about 60 ppb (by weight) to about 400 ppb (by weight) based on the weight of the diol compound. Within this range, sufficient reactivity can be obtained and generation of by-products due to side reactions can be minimized.

In one embodiment, the polycarbonate resin may have a weight average molecular weight of about 10,000 g/mol to about 200,000 g/mol, for example, about 15,000 g/mol to about 40,000 g/mol, as measured by gel permeation chromatography (GPC). Within this range, the polycarbonate resin can have good moldability and mechanical properties.

In one embodiment, the polycarbonate resin may have an intrinsic viscosity of about 0.1 dl/g to about 3.0 dl/g, for example, about 0.3 dl/g to about 2.0 dl/g, as measured at about 25° C. using a tetrahydrofuran (THF) solution (concentration: about 0.5 g/dl). Within this range, the polycarbonate resin can have good moldability and mechanical properties.

In one embodiment, the polycarbonate resin may have a Mark-Houwink constant of about 0.65 or less, for example, about 0.50 to about 0.65. Here, the Mark-Houwink constant may be calculated by plotting the intrinsic viscosity as a function of molecular weight by gel permeation chromatography (GPC). A linear polycarbonate resin has a Mark-Houwink constant value close to about 0.7, and the Mark-Houwink constant becomes lower with increasing degree of branching of a polycarbonate resin. Generally, a polycarbonate resin having a branched structure has a Mark-Houwink constant of about 0.65 or less.

In one embodiment, the polycarbonate resin may have a flame retardancy of V-1 or more, for example, V-0, as measured on an about 2.0 mm thick specimen by the UL-94 vertical test method.

In one embodiment, the polycarbonate resin may have a notched Izod impact strength of about 6 kgf·cm/cm to about 20 kgf·cm/cm, for example, about 8 kgf·cm/cm to about 15 kgf·cm/cm, as measured on an about ⅛" thick specimen in accordance with ASTM D256.

In one embodiment, the polycarbonate resin may have a transmittance (total luminous transmittance) of about 85% or more, for example, about 88% to about 95%, as measured on an about 3.2 mm thick specimen in accordance with ASTM D1003.

In one embodiment, the polycarbonate resin may have a Vicat softening temperature (VST) of about 130° C. or more, for example, about 140° C. to about 150° C., as measured under a load of about 5 kg in accordance with ASTM D1525.

The polycarbonate resin according to the present invention has good properties in terms of flame retardancy, heat resistance, transparency, impact resistance, and appearance and can be produced into a high-quality molded article without adding typical additives such as an impact modifier and a flame retardant. For example, a molded article manufactured using the polycarbonate resin may be used as an exterior material for electric/electronic products, an interior/exterior material for automobile parts, a material for office equipment, and an optical material such as an optical film.

In one embodiment, the polycarbonate resin may be prepared in pellet form by mixing the aforementioned components, followed by melt extrusion in a typical twin-screw type extruder at about 200° C. to about 280° C., for example, about 250° C. to about 260° C. The molded article may be manufactured by any typical method such as extrusion, injection molding, vacuum molding, casting, compression molding, blowing, and calendaring. These methods are well known to those of ordinary skill in the art to which the present invention pertains.

In one embodiment, in molding of the polycarbonate resin, typical additives such as fillers, flame retardants, impact modifiers, anti-dripping agents, antimicrobial agents, heat stabilizers, antioxidants, release agents, light stabilizers, surfactants, plasticizers, lubricants, antistatic agents, dyes, pigments, or combinations thereof may be further used. The fillers may include any typical fillers used in a thermoplastic resin composition. For example, the fillers may include talc, wollastonite, glass fibers, whiskers, silica, mica, basalt fibers, and mixtures thereof, without being limited thereto. The additives may be present in an amount of about 100 parts by weight or less, for example, about 0.1 parts by weight to about 40 parts by weight, relative to about 100 parts by weight of the polycarbonate resin, without being limited thereto.

MODE FOR INVENTION

Next, the present invention will be described in more detail with reference to some examples. It should be understood that these examples are provided for illustration only and are not to be construed in any way as limiting the present invention.

Descriptions of details apparent to those skilled in the art will be omitted for clarity.

EXAMPLE

Examples 1 to 4 and Comparative Example 1

In amounts as listed in Table 1, 2,2-bis(4-hydroxyphenyl) propane (BPA), 1,1,1-tris(4-hydroxyphenyl) ethane (THPE), diphenyl carbonate (DPC), diphenyl phenylphosphonate (PDPP), and 200 ppb of KOH (per 1 weight of BPA) were placed in a reactor, which in turn was filled with nitrogen. Then, the aforementioned components were reacted at 160° C. to 280° C. at 100 torr to 0.5 torr for 8 hours, thereby obtaining a molten polycarbonate resin. The weight average molecular weight, intrinsic viscosity, and Mark-Houwink constant of the obtained polycarbonate resin were measured by gel permeation chromatography (GPC), and results are shown in Table 1. In addition, the molten polycarbonate resin was subjected to extrusion in a twin-screw type extruder (L/D: 36, diameter: 45 mm) at 240° C., followed by pelletization using a pelletizer. Then, the pelletized polycarbonate resin (A) was dried in an oven at 120° C. for 4 hours, followed by injection molding at a molding temperature of 290° C. at a mold temperature of 70° C. using an injection machine (DHC 120WD, DONGSHIN HYDRAULICS), thereby preparing a specimen. The prepared specimen was evaluated as to the following properties. Results are shown in Table 2.

TABLE 1

|  | Example | | | | Comparative Example |
|---|---|---|---|---|---|
|  | 1 PC1 | 2 PC2 | 3 PC3 | 4 PC4 | 1 PC5 |
| BPA (parts by mole) | 100 | 100 | 100 | 100 | 100 |
| THPE (parts by mole) | 0.5 | 0.5 | 0.5 | 0.5 | — |
| DPC (parts by mole) | 99 | 97 | 94 | 89 | 89 |
| PDPP (parts by mole) | 5 | 7 | 10 | 15 | 15 |
| Molar ratio: BPA/(DPC + PDPP) | 100/104 | 100/104 | 100/104 | 100/104 | 100/104 |
| Molar ratio: DPC:PDPP | 19.8:1 | 13.9:1 | 9.4:1 | 5.9:1 | 5.9:1 |
| Weight average molecular weight (g/mol) | 25,000 | 26,000 | 22,000 | 28,000 | 25,000 |
| Intrinsic viscosity (dl/g) | 0.52 | 0.53 | 0.51 | 0.55 | 0.53 |
| Mark-Houwink constant | 0.53 | 0.54 | 0.56 | 0.52 | 0.69 |

Comparative Examples 2 to 5

In amounts as listed in Table 2, (B) a bisphenol-A type polycarbonate resin (PANLITE L-1250WP, Teijin Co., ltd., weight average molecular weight: 25,000 g/mol), (C) a branched polycarbonate resin (LUPOY 1600-3, LG Chemicals), (D) resorcinol-di(bis-2,6-methylphenyl)phosphate (PX-200, Daihachi Chemical) as a flame retardant, and (E) an impact modifier (fluorine compound) (FS-200, Han Nano Tech) were mixed, and then the mixture was subjected to extrusion in a twin-screw type extruder (L/D: 36, diameter: 45 mm) at 240° C., followed by pelletization using a pelletizer. Then, the pelletized polycarbonate resin (composition) was dried in an oven at 120° C. for 4 hours, followed by injection molding at a molding temperature of 290° C. and a mold temperature of 70° C. using an injection machine (DHC 120WD, DONGSHIN HYDRAULICS), thereby preparing a specimen. The prepared specimen was evaluated as to the following properties. Results are shown in Table 2.

Property Evaluation (1) Flame retardancy: Flame retardancy was measured on a 3.0 mm or 2.0 mm thick specimen by the UL-94 vertical test method.

(2) Impact resistance (unit: kgf·cm/cm): Notched Izod impact strength was measured on a ⅛" thick notched Izod specimen in accordance with ASTM D256.

(3) Transmittance (unit: %): Light transmittance (total luminous transmittance) was measured on a 3.2 mm thick specimen using a haze meter (NDH 2000, Nippon Denshoku Industries Co., Ltd.) in accordance with ASTM D1003.

(4) Vicat softening temperature (VST) (unit: ° C.): Vicat softening temperature was measured under a load of 5 kg in accordance with ASTM D1525.

(5) Appearance of injection-molded specimen: 10 specimens having a size of 100 mm×100 mm×3.2 mm were obtained by injection molding at a molding temperature of 320° C. and a mold temperature of 70° C., followed by cooling for 120 seconds, and the numbers of silver streaks on the specimens were measured.

TABLE 2

|  |  | Example |  |  |  | Comparative Example |  |  |  |  |
|---|---|---|---|---|---|---|---|---|---|---|
|  |  | 1 | 2 | 3 | 4 | 1 | 2 | 3 | 4 | 5 |
| (A) (wt %) | PC1 | 100 | — | — | — | — | — | — | — | — |
|  | PC2 | — | 100 | — | — | — | — | — | — | — |
|  | PC3 | — | — | 100 | — | — | — | — | — | — |
|  | PC4 | — | — | — | 100 | — | — | — | — | — |
|  | PC5 | — | — | — | — | 100 | — | — | — | — |
| (B) (wt %) |  | — | — | — | — | — | 100 | 100 | 50 | 100 |
| (C) (wt %) |  | — | — | — | — | — | — | — | 50 | 0 |
| (D) (parts by weight) |  | — | — | — | — | — | — | 20 | 20 | 20 |
| (E) (parts by weight) |  | — | — | — | — | — | — | — | — | 1 |
| Flame retardancy (3.0 mm thick specimen) |  | V-0 | V-0 | V-0 | V-0 | V-0 | V-2 | V-0 | V-0 | V-0 |
| Flame retardancy (2.0 mm thick specimen) |  | V-0 | V-0 | V-0 | V-0 | V-2 | V-2 | V-2 | V-0 | V-0 |
| Izod impact strength |  | 9.8 | 9.3 | 8.8 | 8.5 | 8.4 | 78 | 4.9 | 4.8 | 4.7 |
| Transmittance |  | 89 | 89 | 89 | 89 | 89 | 89 | 89 | 89 | 0.2 |
| VST (° C.) |  | 145 | 143 | 144 | 143 | 144 | 143 | 107 | 108 | 107 |
| Appearance of injection-molded specimen (number of silver streaks/10 specimens) |  | 0 | 0 | 0 | 0 | 1 | 0 | 15 | 16 | 15 |

From the results in Table 2, it can be seen that the polycarbonate resin according to the present invention (Examples 1 to 4) had good properties in terms of flame retardancy, heat resistance, impact resistance, transparency, and appearance without using additives.

Conversely, it can be seen that the polycarbonate resin not including THPE (the compound represented by Formula 7) (Comparative Example 1) had relatively poor properties in terms of flame retardancy and impact resistance, as compared with Examples 1 to 4, the typical polycarbonate resin (Comparative Example 2) had poor flame retardancy, the typical polycarbonate resin with a flame retardant added thereto (Comparative Example 3) and the branched polycarbonate resin with a flame retardant added thereto (Comparative Example 4) had poor properties in terms of impact resistance, heat resistance, and appearance, and a polycarbonate resin with a flame retardant and an impact modifier added thereto (Comparative Example 5) had considerably low transparency and had poor properties in terms of heat resistance and appearance.

It should be understood that various modifications, changes, alterations, and equivalent embodiments can be made by those skilled in the art without departing from the spirit and scope of the invention.

The invention claimed is:

1. A polycarbonate resin comprising:
a repeat unit represented by Formula 1;
a repeat unit represented by Formula 2; and
a unit represented by Formula 3:

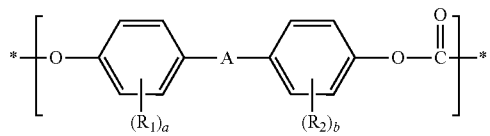

[Formula 1]

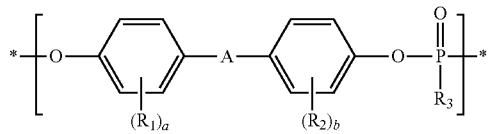

[Formula 2]

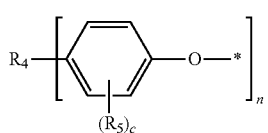

[Formula 3]

wherein A is a single bond, a $C_1$ to $C_{20}$ hydrocarbon group, —CO—, —O—, —S—, or —SO$_2$—; $R_1$, $R_2$, and $R_5$ are each independently a halogen atom or a $C_1$ to $C_{10}$ hydrocarbon group; $R_3$ is a $C_1$ to $C_{20}$ alkyl group, a $C_6$ to $C_{20}$ aryl group, a $C_1$ to $C_{20}$ alkoxy group, or a $C_6$ to $C_{20}$ aryloxy group; $R_4$ is a $C_1$ to $C_{20}$ hydrocarbon group; a, b, and c are each independently an integer of 0 to 4; n is an integer of 3 to 6; and * is a binding site.

2. The polycarbonate resin according to claim 1, wherein a molar ratio of the repeat unit represented by Formula 1 to the repeat unit represented by Formula 2 ranges from about 5:1 to about 100:1, and the unit represented by Formula 3 is present in an amount of about 0.01 parts by mole to about 10 parts by mole relative to 100 parts by mole of the repeat unit represented by Formula 1 and the repeat unit represented by Formula 2.

3. The polycarbonate resin according to claim 1, wherein the polycarbonate resin has a weight average molecular weight of about 10,000 g/mol to about 200,000 g/mol.

4. The polycarbonate resin according to claim 1, wherein the polycarbonate resin has an intrinsic viscosity of about 0.1 dl/g to about 3.0 dl/g.

5. The polycarbonate resin according to claim 1, wherein the polycarbonate resin has a Mark-Houwink constant of about 0.50 to about 0.65.

6. The polycarbonate resin according to claim 1, wherein the polycarbonate resin has a flame retardancy of V-1 or more, as measured on an about 2.0 mm thick specimen by the UL-94 vertical test method.

7. The polycarbonate resin according to claim 1, wherein the polycarbonate resin has a notched Izod impact strength of about 6 kgf·cm/cm to about 20 kgf·cm/cm, as measured on an about ⅛" thick specimen in accordance with ASTM D256.

8. The polycarbonate resin according to claim 1, wherein the polycarbonate resin has a transmittance of about 85% or more, as measured on an about 3.2 mm thick specimen in accordance with ASTM D1003.

9. The polycarbonate resin according to claim 1, wherein the polycarbonate resin has a Vicat softening temperature of about 130° C. or more, as measured under a load of about 5 kg in accordance with ASTM D1525.

10. A method of preparing a polycarbonate resin, comprising:

reacting a diol compound represented by Formula 4 with a carbonate ester compound represented by Formula 5, a phosphoric acid ester compound represented by Formula 6, and a compound represented by Formula 7:

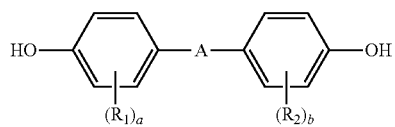

[Formula 4]

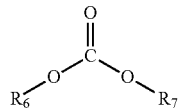

[Formula 5]

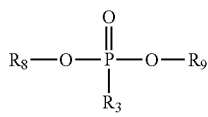

[Formula 6]

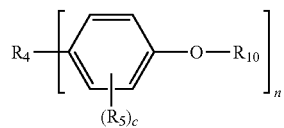

[Formula 7]

wherein A is a single bond, a $C_1$ to $C_{20}$ hydrocarbon group, —CO—, —O—, —S—, or —SO$_2$—; $R_1$, $R_2$, and $R_5$ are each independently a halogen atom or a $C_1$ to $C_{10}$ hydrocarbon group; $R_3$ is a $C_1$ to C20 alkyl group, a $C_6$ to $C_{20}$ aryl group, a $C_1$ to $C_{20}$ alkoxy group, or a $C_6$ to $C_{20}$ aryloxy group; $R_4$ is a $C_1$ to $C_{20}$ hydrocarbon group; $R_6$, $R_7$, $R_8$ and $R_9$ are each independently a $C_1$ to $C_{10}$ hydrocarbon group; $R_{10}$ is a hydrogen atom, a $C_1$ to $C_{10}$ alkyl group, or a $C_6$ to $C_{10}$ aryl group; a, b, and c are each independently an integer of 0 to 4; and n is an integer of 3 to 6.

11. The method according to claim 10, wherein a molar ratio of the carbonate ester compound represented by Formula 5 to the phosphoric acid ester compound represented by Formula 6 ranges from about 5:1 to about 100:1; a total amount of the carbonate ester compound represented by Formula 5 and the phosphoric acid ester compound represented by Formula 6 ranges from about 100 parts by mole to about 110 parts by mole relative to about 100 parts by mole of the diol compound represented by Formula 4; and an amount of the compound represented by Formula 7 ranges from about 0.01 parts by mole to about 10 parts by mole relative to about 100 parts by mole of the diol compound represented by Formula 4.

12. A molded article formed of the polycarbonate resin according to claim 1.

* * * * *